(12) United States Patent
George et al.

(10) Patent No.: US 12,242,285 B2
(45) Date of Patent: Mar. 4, 2025

(54) SYSTEM AND METHOD FOR AIRCRAFT CONFIGURATION CHECKING

(71) Applicant: Merlin Labs, Inc., Boston, MA (US)

(72) Inventors: Matthew George, Boston, MA (US); Alexander Naiman, Boston, MA (US); Angel Macias, Boston, MA (US); Aubrey Kalashian, Boston, MA (US); Kevin Elfenbein, Boston, MA (US)

(73) Assignee: Merlin Labs, Inc., Boston, MA (US)

( * ) Notice: Subject to any disclaimer, the term of this patent is extended or adjusted under 35 U.S.C. 154(b) by 0 days.

(21) Appl. No.: 18/423,149

(22) Filed: Jan. 25, 2024

(65) Prior Publication Data
US 2024/0248481 A1 Jul. 25, 2024

Related U.S. Application Data

(60) Provisional application No. 63/444,145, filed on Feb. 8, 2023, provisional application No. 63/441,103, filed on Jan. 25, 2023.

(51) Int. Cl.
*G05D 1/2285* (2024.01)
*G05D 109/20* (2024.01)

(52) U.S. Cl.
CPC ....... *G05D 1/2285* (2024.01); *G05D 2109/20* (2024.01)

(58) Field of Classification Search
None
See application file for complete search history.

(56) References Cited

U.S. PATENT DOCUMENTS

| | | | |
|---|---|---|---|
| 11,447,272 B2 | 9/2022 | Lampazzi et al. | |
| 2007/0288129 A1* | 12/2007 | Komer | G10L 15/26 |
| | | | 701/4 |
| 2016/0018793 A1 | 1/2016 | Becker et al. | |
| 2016/0294882 A1* | 10/2016 | Michaels | H04L 65/1013 |
| 2018/0364707 A1* | 12/2018 | Bosworth | B64D 45/0056 |
| 2019/0033862 A1* | 1/2019 | Groden | G08G 5/0086 |
| 2019/0318741 A1 | 10/2019 | Songa et al. | |
| 2020/0118366 A1 | 4/2020 | Ryan et al. | |
| 2020/0298994 A1 | 9/2020 | Conaway et al. | |
| 2022/0009651 A1* | 1/2022 | Lampazzi | B64D 45/00 |

* cited by examiner

*Primary Examiner* — Tamara L Weber
(74) *Attorney, Agent, or Firm* — Jeffrey Schox; Diana Lin (57) ABSTRACT

The method can include: optionally determining an aircraft state; determining a transition event; verifying an aircraft configuration; determining an aircraft alert state; and performing an action. However, the method can additionally or alternatively include any other suitable elements. The method functions to facilitate configuration checking and/or validation of configuration changes. Additionally or alternatively, the method can function to facilitate human-in-the-loop operation of a semi-autonomous aircraft (e.g., with an autonomous agent fulfilling the roles of one pilot of a multi-pilot aircraft). Additionally or alternatively, the method can function to autonomously respond to inconsistencies or failures associated with aircraft configuration changes.

21 Claims, 10 Drawing Sheets

SYSTEM AND METHOD FOR AIRCRAFT CONFIGURATION CHECKING

CROSS REFERENCE TO RELATED APPLICATIONS

This application claims the benefit of U.S. Provisional Application No. 63/444,145, filed 8 Feb. 2023, and U.S. Provisional Application No. 63/441,103, filed 25 Jan. 2023, each of which is incorporated herein in its entirety by this reference.

TECHNICAL FIELD

This invention relates generally to the aviation field, and more specifically to a new and useful configuration checking system and/or method in the aviation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
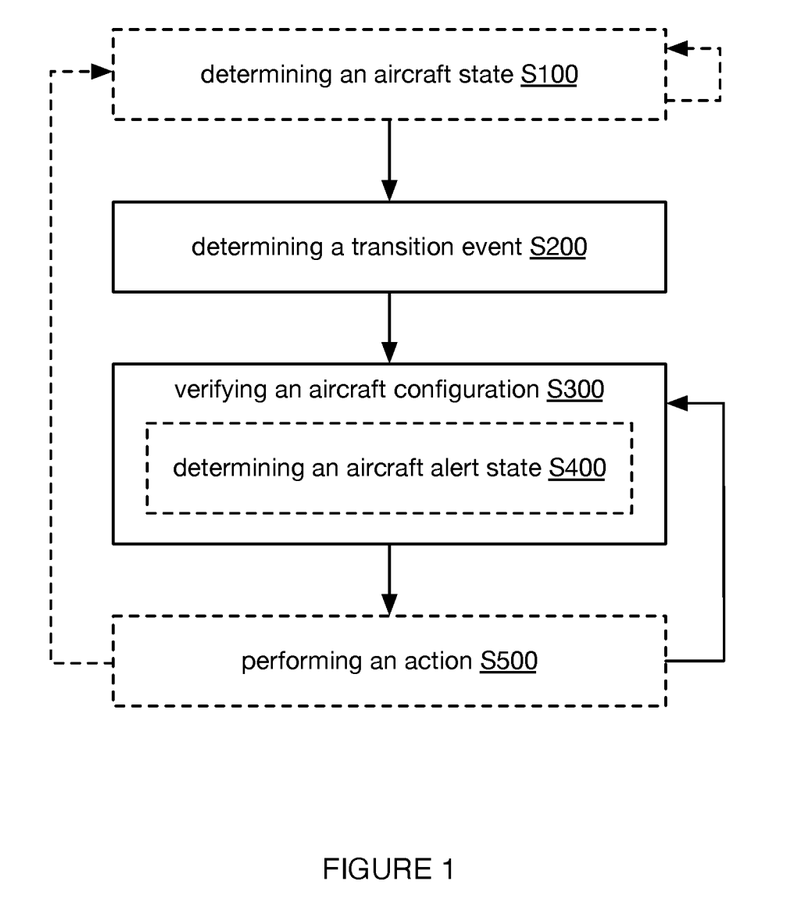
FIG. 1 is a flowchart diagram of a variant of the method.

The method, an example of which is shown in FIG. 1, can include: optionally determining an aircraft state S100; determining a transition event S200; verifying an aircraft configuration S300; determining an aircraft alert state S400; and performing an action S500. However, the method S100 can additionally or alternatively include any other suitable elements. The method functions to facilitate configuration checking and/or validation of configuration changes. Additionally or alternatively, the method can function to facilitate human-in-the-loop operation of a semi-autonomous aircraft (e.g., with an autonomous agent fulfilling the roles of one pilot of a multi-pilot aircraft). Additionally or alternatively, the method can function to autonomously respond to inconsistencies or failures associated with aircraft configuration changes.

The system and/or method is preferably implemented in conjunction with and/or executed by an aircraft, such as a rotorcraft (e.g., helicopter, multi-copter), fixed-wing aircraft (e.g., airplane), Short Takeoff and Landing (STOL) aircraft, lighter-than-air aircraft, multi-copter, and/or any other suitable aircraft. The method can be implemented with an autonomous aircraft, unmanned aircraft (UAV), manned aircraft (e.g., with a pilot, with an unskilled operator executing primary aircraft control), semi-autonomous aircraft, single pilot aircraft, multi-pilot aircraft, and/or any other suitable aircraft. The aircraft is preferably an autonomous aircraft configured to execute flight commands according to a mission plan using a flight processor without user (e.g., pilot) intervention. Additionally or alternatively, the method can be implemented on a semi-autonomous vehicle (e.g., a human-in-the-loop aircraft with autonomous functionality and/or autonomous co-pilot) and/or human-operated vehicle as a flight aid.

The system and/or method can be implemented in conjunction with a fly-by-wire (FBW) aircraft, manually/mechanically controllable aircraft (e.g., with a mechanical flight control system and/or hydraulic flight control system), and/or any other suitable aircraft or vehicle system(s).

In variants, the system, processing components, method, and/or other elements of the system can be implemented in conjunction with a portable device (a.k.a., a "bring-aboard device"), as a pilot recommendation device, and/or as an after-market add-on (e.g., prior to an individual flight; after-market integration, etc.). For example, the system may be separately certified from the aircraft and/or critical infrastructure installed onboard the aircraft (e.g., separately certified portable device; not certified with a built-in Multi-Function Display [MFD]).

In variants, the system and/or method can be implemented within the low Design Assurance Level (DAL) and/or high DAL portions of the aircraft computing system(s) and/or aircraft computing architecture as described in U.S. application Ser. No. 17/891,845, filed 19 Aug. 2022, titled "ADVANCED FLIGHT PROCESSING SYSTEM AND/OR METHOD", which is incorporated herein in its entirety by this reference. For example, attention monitoring, verification checks, and/or aircraft configuration state management, and/or alert level escalation(s) may be implemented at a high DAL portion of the aircraft computing system, with advanced functionalities (e.g., CV vision tracking; natural language processing [NLP] and/or communication parsing; co-pilot checklist tasks/verifications; autonomous navigation, advanced tracking and collision avoidance, etc.) at a low DAL portion of the computing architecture.

In variants, the system and/or method can be implemented in conjunction with semantic parsing of aircraft and/or ATC communications as described in: U.S. application Ser. No. 17/500,358, filed 13 Oct. 2021; and/or U.S. application Ser. No. 17/719,835, filed 13 Apr. 2022, each of which is incorporated herein in its entirety by this reference.

In variants, the system and/or method can include and/or operate in conjunction with the pilot attention state monitoring systems and/or methods as described in U.S. application Ser. No. 18/379,095, filed 11 Oct. 2023, which is incorporated herein in its entirety by this reference. For instance, variants may escalate alert states and/or facilitate handoffs between autonomous agent(s) and/or human pilots based on pilot attention state.

The terms "cockpit" and "flight deck" may be interchangeably referenced herein with regard to the pilot compartment and/or control deck (e.g., where pilot seat and/or controls are housed). However, the terms cockpit and/or flight deck can be otherwise utilized and/or referenced herein.

The term "aircraft configuration" as utilized herein preferably refers to a subset of specific effector positions, control states, and/or aircraft parameters which are maintained for a particular state/phase of flight (e.g., as governed by various regulatory requirements; according to a flight manual; etc.).

It is understood that effectors can be individually configured and/or multiple effectors may be coordinated to achieve a particular configuration. Likewise, various permutations/combinations of configurations (or sub-configurations) of effector states may exist simultaneously, which can be interchangeably referenced as a single, unitary aircraft configuration, or separately as may be convenient. As an example, the aircraft configuration can refer to a landing gear configuration (e.g., stowed or deployed), a flap configuration (e.g., 10 degrees, 20 degrees, etc.), thrust/propulsive power setting, other effector states, and/or any combination/permutation thereof. As a second example, the term aircraft configuration can refer to the discrete states within an aircraft (configuration) state machine, such as may be used for aircraft control. However, the term aircraft configuration can alternatively refer to an aircraft configuration as referenced in a flight manual for a particular aircraft, and/or can be otherwise suitably referenced herein.

The term "substantially" as utilized herein can mean: exactly, approximately, within a predetermined threshold or tolerance, and/or have any other suitable meaning.

1.1 Examples

In a first set of variants, a method can include: determining an aircraft transition event; in response to the aircraft transition event, initializing a checklist procedure to verify an aircraft configuration, the checklist procedure comprising a plurality of checks, for a first subset of the plurality of checks: prompting a pilot to verify a respective system state and confirming the respective system state based on a pilot input, and for a remainder of the plurality of checks: autonomously verifying a respective state parameter of an aircraft state based on a set of onboard sensors and notifying the pilot of the verification; and performing an action based on the checklist procedure. The checklist procedure can be executed at an autonomous computing system onboard the aircraft, the autonomous computing system communicatively coupled to an aircraft computing system which includes a flight management system (FMS), wherein performing the action includes controlling the aircraft according to a flight command at an aircraft computing system. For example, each check of the checklist procedure can be completed sequentially and with inputs from both the pilot and the autonomous computing system. Additionally or alternatively, each of the plurality of checks can be completed autonomously (e.g., verifying a respective state parameter of an aircraft state based on a set of onboard sensors).

In a first example, the checklist procedure can be manually initialized by a pilot via a user interface (e.g., HMI; MFD; etc.). In a second example, the checklist procedure (and/or individual tasks thereof) can be automatically triggered based on the aircraft state.

In variants, prompting the pilot can include an auditory checklist challenge, wherein the pilot input comprises an audio input from an onboard audio sensor, wherein confirming the respective system state based on a pilot input comprises a Natural Language Processing (NLP) evaluation of the audio input.

In variants, set of onboard sensors can include a camera (e.g., within the cockpit and oriented towards flight deck instruments/gauges), wherein, for the remainder of checks, autonomously verifying the respective state parameter comprises: estimating an instrument state by computer vision (CV) analysis of an image from the camera (e.g., CV analysis of a gauge value/position; indicator light state; switch state, etc.).

In a second set of variants, a method for an aircraft can include: in response to an aircraft transition event, retrieving a checklist associated with the aircraft transition event, the checklist including a sequence of checks, each check associated with a respective aircraft component and including challenge text and a predefined set of respective responses; for a first check of the sequence, providing a first synthetic utterance of the challenge text using text-to-speech transformation, receiving audio data and instrument state data; determining a pilot response to the first synthetic utterance, within the predefined set of respective responses for the first check, by Natural Language Processing (NLP) of the audio data; based on the pilot response, autonomously verifying the first check of the sequence using the instrument state data; based on the autonomous verification of the first check, updating an aircraft configuration at an aircraft computing system; and controlling the aircraft based on the updated aircraft configuration.

In a first variant, the instrument state data includes estimated instrument states determined by computer vision (CV) analysis of a set of indicators (e.g., gauges, switches, levers, lights, buttons, etc.). As an example, CV analysis, NLP, and text-to-speech transformation are executed at a portable device which is communicatively coupled to the aircraft computing system.

2. Benefits

Variations of the technology can afford several benefits and/or advantages.

First, variations of this technology can facilitate automated and/or autonomous validation of aircraft configuration changes. As an example, a pilot (and/or co-pilot) may be required to perform a series of checks (and/or cross-checks) to validate configuration changes, as may be specified in a flight manual (e.g., as many as ten or more unique checks may be required for some high criticality aircraft systems/transitions). Variants can facilitate partially or fully autonomous execution of this validation operation, which can reduce the workload of a pilot and/or act in place of a co-pilot in various aircraft contexts. In an illustrative example, the technology can automatically determine a target configuration change (e.g., based on aircraft state, ATC commands, etc.) and notify a human pilot of the target configuration change. The technology can optionally receive confirmation of the target configuration change from the human pilot and automatically implement the target configuration change. In another illustrative example, the technology can validate that a pilot-stated configuration change is the correct configuration change, and/or that the pilot-stated configuration change has been implemented. In variants, variants can facilitate automated and/or autonomous validation of aircraft configuration changes via portable ('bring-aboard') devices (e.g., which may not be subject to the same certification requirements as built-in MFDs, allowing them to be provided as an after-market retrofit/install and/or brought aboard for a particular flight/mission).

Second, variations of this technology can implement automated or autonomous cross-checks to facilitate integration of advanced flight processing systems and/or methods (e.g., such as those described in U.S. application Ser. No. 17/891,845, filed 19 Aug. 2022, which is incorporated herein in its entirety by this reference) into existing aircraft system. Additionally such variants may facilitate autonomous execution of at least one role in a multi-pilot checklist procedure (i.e., where the autonomous agent handles a co-pilot role with a single human pilot).

Third, variations of this technology can include an approach necessarily rooted in computer technology for overcoming a problem specifically arising in the realm of computer networks. In variants, the technology can enable control of an aircraft using a partially and/or fully autonomous system. In a first example, the system/method may facilitate autonomous validation of a human-in-the-loop control of a semi-autonomously controlled aircraft (e.g., for a manned aircraft with some level of autonomy) and/or replace an onboard pilot (e.g., for an unmanned aircraft; replacing one pilot of a multi-pilot aircraft). In a second example, autonomous verification of aircraft configuration changes may enable certification of human-in-the-loop automated/autonomous aircraft systems which may be otherwise uncertifiable (e.g., thus solving a challenge which necessarily arises in the realm of flight automation/autonomy). In a third example, the system and/or method can autonomously cross-check/validate configuration changes of a separate or independent autonomous agent, which may facilitate various forms of (certifiable) autonomous integration, such as in a multi-pilot-aircraft context.

Fourth, variations of this technology can reduce risk associated with aircraft configuration changes by utilizing multiple independent, orthogonal, and/or redundant data sets to automatically detect and/or validate aircraft configuration changes.

However, variations of the technology can additionally or alternately provide any other suitable benefits and/or advantages.

3. Method

The method, an example of which is shown in FIG. 1, can include: optionally determining an aircraft state S100; determining a transition event S200; verifying an aircraft configuration S300; optionally determining an aircraft alert state S400; and performing an action S500. However, the method S100 can additionally or alternatively include any other suitable elements. The method functions to facilitate configuration checking and/or validation of configuration changes. Additionally or alternatively, the method can function to facilitate human-in-the-loop operation of a semi-autonomous aircraft (e.g., with an autonomous agent fulfilling the roles of one pilot of a multi-pilot aircraft). Additionally or alternatively, the method can function to autonomously respond to inconsistencies or failures associated with aircraft configuration changes.

The method and/or any subset/portion thereof can be executed with a computing system onboard an aircraft, and more preferably a computing system which is separate from the aircraft FCS/FMS and/or an autonomous agent onboard the aircraft, however the method can be otherwise integrated with an aircraft and/or otherwise implemented with existing computing architecture thereof. For example, the method can be executed with a dedicated computing module, such as by a validation module within the higher assurance portion of the aircraft computing system(s) and/or aircraft computing architecture as described in U.S. application Ser. No. 17/891,845, filed 19 Aug. 2022, titled "ADVANCED FLIGHT PROCESSING SYSTEM AND/OR METHOD", which is incorporated herein in its entirety by this reference. Alternatively, the method and/or elements thereof can be otherwise implemented in conjunction with an aircraft computing system, implemented within a pilot interface for a human-in-the-loop autonomy system, implemented as a flight aid, and/or otherwise implemented/executed for an aircraft or other suitable vehicle system.

The method can be executed once, repeatedly, iteratively, continuously, periodically (e.g., less than 0.1 Hz, 1 Hz, 10 Hz, 20 Hz, greater than 20 Hz, any open or closed range bounded by the aforementioned values, etc.), in response to an event trigger (e.g., ATC communication trigger, etc.), and/or with any other suitable timing/frequency. Likewise, in variants, method sub-elements can be executed serially, sequentially, simultaneously, contemporaneously, aperiodically, and/or with any other suitable timing/relationship. However, the method can be otherwise executed with any other suitable timing.

Optionally determining an aircraft state S100 functions to provide context for evaluating aircraft configuration(s) and/or can be used to detect aircraft transitions via S200. Additionally or alternatively, the aircraft state can be used to verify aircraft configurations via S300. The aircraft state is preferably received from an integrated aircraft processor, such as the Flight Management System (FMS) or Flight Control System (FCS), but can additionally or alternatively the aircraft state and/or aircraft an aircraft configuration associated therewith can be determined with sensor data collected with an onboard sensor suite, based on ATC radio communications, based on a flight plan, and/or any other suitable data. In a first variant, the aircraft state and/or parameters thereof can be received from a flight controller (e.g., FMS, FCS, autonomous processing agents, etc.) via a wired connection (e.g., for processing onboard the aircraft) and/or via wireless communication (e.g., used for separate processing at a remote endpoint; via radiofrequency and/or satellite communications). The aircraft state can be determined by fusing any suitable set of aircraft sensors, remote sensors, and/or control states (e.g., aircraft configurations).

The aircraft state can include aircraft effector parameters and/or flight control surface parameters, such as: a throttle parameter, a rudder position/angle, an elevator position/angle, a flap position/angle, an aileron position/angle, a landing gear deployment state (e.g., stowed or deployed), and/or any other suitable effector parameters. The aircraft state can additionally or alternatively include positional parameters, such as: the geodetic position of the aircraft, the attitude (e.g., pitch, roll, and yaw/heading) of the aircraft, a linear velocity vector of the aircraft, an angular velocity vector of the aircraft, a linear acceleration vector of the aircraft, an angular acceleration vector of the aircraft, a relative wind velocity of the aircraft, an above ground level (AGL) altitude of the aircraft, and/or any other suitable positional parameters. The aircraft state can additionally or alternatively include flight envelope parameters and/or envelope protection state, effector parameters (e.g., flap position, propeller RPM, etc.), and/or any other suitable state parameters. The aircraft state can optionally include a flight regime such as 'cruise', 'approach' (e.g., landing sequence), 'go-around maneuver', and/or any other suitable flight regimes, which can be provided as an aircraft state parameter. In variants, the aircraft state can include a risk advisory status received from one or more autonomous aircraft agents, such as: a flight protection status, a collision avoidance advisory, a terrain avoidance advisory, a weather avoidance advisory, an ATC advisory (e.g., extracted via NLP), an aircraft alert state (e.g., as determined via S400), and/or any other suitable advisories/statuses. However, the aircraft state can include any other suitable parameters and/or can be otherwise suitably determined.

In a first variant, where the method is executed with a computing system (e.g., partitioned from a flight computer and/or an autonomous agent), the aircraft state is determined by a (separate) aircraft computing system and received at the computing system.

In a second variant, non-exclusive with the first, the aircraft state is determined substantially continuously/periodically with an onboard sensor suite of the aircraft. For example, the aircraft state can be determined with the system(s) and/or method(s) as described in U.S. application Ser. No. 17/674,518, filed 17 Feb. 2022, titled "METHOD FOR AIRCRAFT LOCALIZATION AND CONTROL," which is incorporated herein in its entirety by this reference.

In a third variant, non-exclusive with the first or second, the aircraft state and/or a subset of parameters thereof can be determined via a pilot input/communication. For example, the flight regime or aircraft configuration can be received from a pilot, for subsequent evaluation/validation by the method (by way of Block S200 and/or S300).

In a fourth variant, non-exclusive with the first, second, or third, the aircraft state can include a belief state of the aircraft configuration, which is specified/determined at least partially with an autonomous agent (i.e., performing a pilot role or an assistive role).

However, the aircraft state can be otherwise suitably determined.

Determining a transition event S200 functions to detect changes in the aircraft configuration (e.g., to be verified by S300). Additionally or alternatively, S200 can function to trigger verification/validation of configuration transitions (e.g., triggering a cross-check or verification sequence, etc.). Additionally or alternatively, S200 can function to detect mismatches between an observed configuration and a belief state/configuration (of an autonomous agent). Transition events can be determined using an aircraft state machine (e.g., based on an aircraft state determined in S100), a lookup table, manual triggers/inputs (e.g., from a pilot), autonomous agent outputs (e.g., autonomous configuration changes/commands), results derived from NLP analysis of ATC communications, and/or other suitable evaluations/analyses. Transition events can be determined: based on the aircraft state and/or aircraft state data (e.g., evaluated for each update to the aircraft state), based on (and/or in response to) manual inputs at a human-machine interface (HMI), based on secondary sensing data (e.g., cockpit camera), and/or based on any other suitable data or evaluations, which may occur with any suitable frequency/timing. As a first example, S200 can include determining a transition event in response to a pilot verification request and/or a manual request (e.g., associated with a configuration transition). As a second example, S200 can include detecting a transition event based on a mismatch between a belief state (e.g., aircraft configuration and/or regime of flight as provided/estimated within the aircraft state) and an observed aircraft state (e.g., based on integrated aircraft sensing and/or auxiliary sensors). As a third example, S200 can include dynamic determinations of (context dependent) configuration changes and/or static/deterministic evaluations.

In a first variant, a transition event can be determined based on the aircraft state history and/or a comparison to a prior aircraft state. For example, aircraft state parameters and/or integrated diagnostics sensing can be used to detect transition events. In variants, transition events may be deterministic and/or may directly evaluated for a particular aircraft state (e.g., as an example, aircraft configurations may correspond to binary aircraft state parameters and/or may have deterministic state parameter values; a transition event can be directly detected based on a detected change in the landing gear state, for example). Additionally or alternatively, in some variants, aircraft configurations may include a discretionary range of actuator states (e.g., "set flaps to 20 or at pilot discretion;" flaps can be deployed until a threshold airspeed is achieved, which may vary discretionarily in a single configuration based on the context—such as when landing in a high crosswind, etc.). Accordingly, transition events can additionally or alternatively be dynamically determined based on the context, ranges of values (e.g., predetermined, dynamically determined based on the context, absolute ranges, relative ranges). For example, transition events can be determined using a (predetermined) lookup table, a state machine, and/or any other otherwise determined using any other suitable algorithms/techniques (e.g., ML-based classifiers, neural networks, heuristic classifiers, etc.).

In a second variant, transition events can be determined based on a pilot communication/input. For example, a (primary) pilot can directly communicate to the verification system that an aircraft configuration change/transition event is being initiated (or has just occurred), wherein the system is configured to autonomously perform the cross-check/verification of the state change in place of a co-pilot (or pilot) in response (e.g., by way of S300). As an example, a pilot can provide an updated configuration (e.g., with a set of state parameter values associated with a current configuration and/or command associated therewith). As a second example, a pilot can communicate a configuration which encodes/corresponds with a deterministic set of parameter values and/or actuator positions. Alternatively, the pilot can communicate a discretionary parameter, and/or any other suitable information in association with a transition.

In a third variant, transition events can be determined by a separate (e.g., partitioned) computing system onboard the aircraft and/or a transition event can be determined based on receipt of a (wired) communication from an onboard computing system, such as an autonomous agent. As an example, an autonomous agent may command new flap position (e.g., thereby transitioning a flap configuration) and report the configuration transition to the pilot and/or a (secondary) verification system, wherein the verification system determines the transition in response to receipt of the command and/or configuration change.

In a fourth variant, the transition event can optionally be determined based on natural language processing (NLP) of radio communications with Air Traffic Control (ATC). For instance, a transition event may be required in order to execute an instruction (e.g., takeoff, final approach, landing, etc.) and pilot/ATC radio communications corresponding to the maneuver may be directly or indirectly associated with various aircraft configurations. In such cases, a transition event can be contextually determined based on the aircraft state and/or natural language processing of ATC radio communications, such as using system, method elements, and/or techniques substantially as described in U.S. application Ser. No. 17/500,358, filed 13 Oct. 2021, which is incorporated herein in its entirety by this reference. As an example, landing gear deployment may necessarily be required prior to a conventional, non-emergency landing of a fixed-wing aircraft, and this configuration may additionally be directly or indirectly linked to various forms of ATC communication (e.g., final approach communications). However, transition events can be otherwise determined based on ATC NLP communications. Alternatively, ATC communications may be independent of a transition event determination and/or may not be used to detect changes in the aircraft configuration.

In a fifth variant, the changes in the aircraft configuration can be detected with a subset of (secondary) sensors used to validate the aircraft configuration in S300. For example, secondary sensors (e.g., independent of integrated aircraft sensors; auxiliary installations; cockpit camera; external camera; redundant sensors; contact switches; linear/rotational resolvers; etc.) can be used to detect mismatches between the observed configuration and an aircraft configuration parameter (e.g., belief state associated aircraft control).

However, the transition events can be otherwise suitably determined, and/or changes in the aircraft configuration can be otherwise determined/detected.

Verifying (a.k.a., checking) an aircraft configuration S300 functions to cross-check a pilot-specified configuration and/or a belief state parameter associated therewith (i.e., a belief state of the aircraft configuration) to be used for aircraft control in accordance with Block S500. S300 preferably occurs in response to detecting a transition event occurrence, but can additionally or alternatively occur: once, in response to satisfaction of a trigger condition (e.g., determination of a trigger event occurrence), repeatedly, periodically, aperiodically, iteratively (e.g., according to a predetermined, deterministic verification sequence), and/or with any other suitable timing/frequency. For example, S300 can include sequential verification of items in a checklist, such as a "Climb" checklist or a "Before Takeoff" checklist. For instance, a "Before Takeoff" checklist may include a predetermined sequence of checks (a.k.a., checklist tasks), each associated with a predetermined set of responses and/or value ranges (e.g., Parking Brake: "As Required"; Seats/Seat Belts/Harness: "Secure"; "Flight Controls": "Free and Correct"; Flight/Engine Instruments: "Check"; Ice Protection: "As Required"; . . . ; Flaps: "Set 20 Degrees"; etc.). Checklists can be initialized in response to a determination of a transition event (e.g., via S200), based on a pilot input (e.g., HMI/MFD selection, NLP voice input), manually, automatically (e.g., based on a determination of a transition event), based on NLP of an audio input (e.g., from a pilot and/or ATC communication), based on a prior checklist (e.g., where failure to complete a checklist item may trigger a secondary checklist and/or repetition of the checklist) and/or can be otherwise initialized. For example, a pilot may initiate a checklist (e.g., Before Takeoff Checklist) with a voice input (e.g., "start before takeoff checklist"). Natural Language Processing of this input may initiate a checklist procedure (e.g., at a portable computing device and/or checklist engine thereof).

Figure 9:
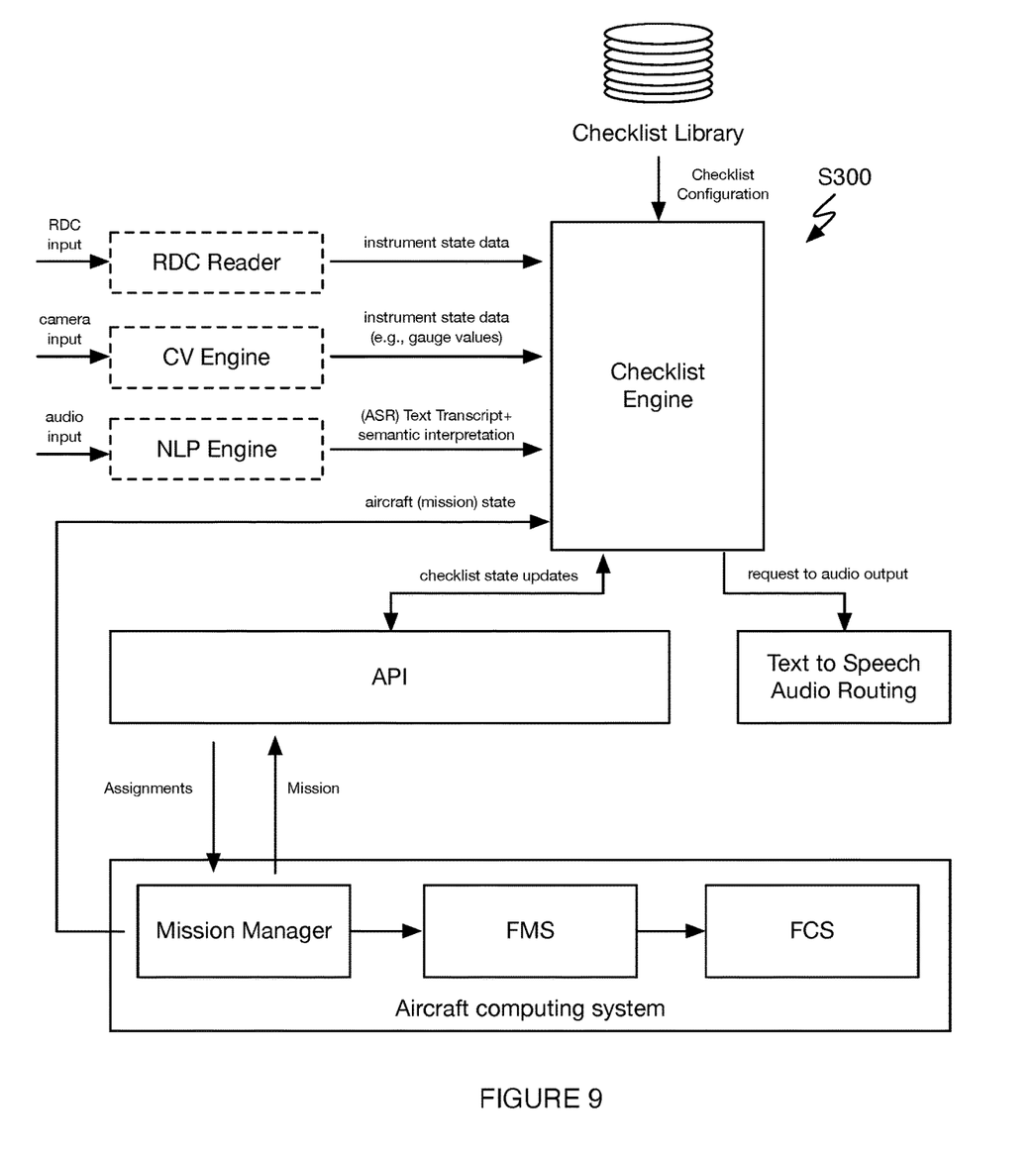
FIG. 9 is a schematic diagram of a variant of the system and/or method.

S300 is preferably executed at a portable device (e.g., Automated Communication Device; portable device partitioned from the aircraft computing system, an example is shown in FIG. 9, etc.). Additionally or alternatively, S300 is preferably executed in conjunction with the computing architecture described in U.S. Application Ser. No. U.S. application Ser. No. 17/891,845, filed 19 Aug. 2022, titled "ADVANCED FLIGHT PROCESSING SYSTEM AND/OR METHOD", such as with the checklist engine and/or NLP and CV functionalities partitioned from the aircraft computing system, but can additionally or alternatively be executed with any suitable architecture.

Verifications/checks in S300 can occur autonomously (e.g., without involvement of the pilot, where a pilot may be notified of verification; human-on-the-loop), automatically, and/or with a human (pilot) in the loop. As an example, S300 can include a checklist procedure to verify an aircraft configuration using a plurality of checks. For a first subset of the plurality of checks, the checklist procedure can include prompting a pilot to verify a respective system state and confirming the respective system state based on a pilot input; and for a remainder of the plurality of checks: the checklist procedure can include autonomously verifying a respective state parameter of an aircraft state based on a set of onboard sensors (e.g., notifying the pilot of the verification). Alternatively, each check can be performed autonomously (e.g., using onboard data and/or auxiliary data sources, such as CV of aircraft indicators, direct component sensing, etc.).

Verifying the aircraft configuration preferably checks the aircraft configuration matches the belief state (e.g., component state/configuration, as an element of the aircraft state and/or control instructions, control parameter, etc.) and/or pilot-specified configuration according to a predetermined set of deterministic tests (e.g., predetermined for each individual configuration; according to a lookup table; etc.) and outputs a set of verification parameters. The belief state can be determined automatically (e.g., based on requirements for a checklist and/or an aircraft state), based on a pilot communications/specifications, based on a pilot input in response to a challenge/prompt, and/or can be otherwise determined. Verification parameters can include a binary verification parameter (e.g., verified or unverified), a verification probability or score, a confidence value, an alert state parameter, a discretionary state score, and/or any other suitable parameters/outputs.

S300 can be executed once (e.g., for a single checklist task/check), repeatedly (e.g., until a checklist task is confirmed), sequentially (e.g., for items in a checklist), in response to a trigger condition (e.g., transition event, based on an alert state), and/or with any other suitable timing. For example, S300 can be executed sequentially for a series of checklist tasks. Additionally or alternatively, checklists and/or checklist procedures can be existed and/or paused if a belief state cannot be verified (e.g., triggering a response action), and/or otherwise handled.

Figure 2:
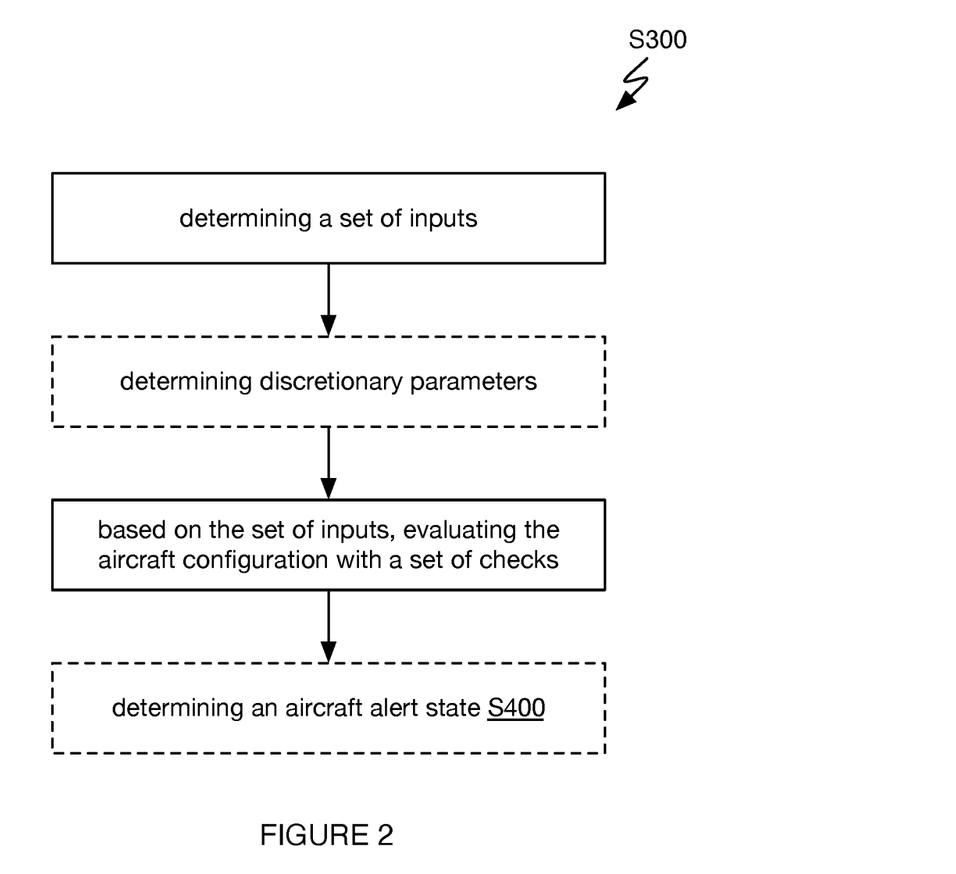
FIG. 2 is a partial flowchart diagram of a variant of the method.

In variants (e.g., an example is shown in FIG. 2), verifying the aircraft configuration can include: determining a set of inputs; optionally determining discretionary parameters; based on the set of inputs, evaluating the aircraft configuration with a set of checks; optionally determining an aircraft alert state S400; and/or any other suitable elements.

Determining the set of inputs functions to generate verification data or inputs which can be used to facilitate verification (e.g., of checklist items). The set of inputs can include: receiving aircraft state data and/or integrated sensing data (e.g., determined via S100, from integrated aircraft sensors) and/or auxiliary inputs. For example, the set of inputs can include (instrument) state data from an aircraft Remote Data Concentrator (RDC) and/or an RDC Reader (e.g., state data from aircraft computing system, such as engine temp, generator speed, propeller RPM, turbine section torque, flap position measurement, etc.). Alternatively, the set of inputs can include only auxiliary inputs (e.g., without direct receipt of aircraft state data or integrated aircraft sensing). The auxiliary inputs preferably include auxiliary sensor data generated using auxiliary monitoring systems/sensors onboard the aircraft, but can additionally or alternatively be generated offboard the aircraft, such as based on remote feedback at a remote interface, and/or based on communications from an air traffic controller. Additionally or alternatively, auxiliary inputs can include derived results/features, extracted from the (auxiliary) sensor data with any suitable techniques, such as ML-based techniques, CV-based techniques, NLP, and/or other advanced processing.

Auxiliary data can be collected by onboard sensors, human machine interface (HMI) sensors (e.g., push-button inputs, touchscreen inputs, MFD inputs, etc.; from a portable device, etc.), optical sensors (e.g., internal-facing cameras arranged in cockpit oriented toward pilot seat, external facing cameras, etc.), resolvers (e.g., linear/rotational, integrated as an add-on to a flight-deck systems, coupled to effectors and/or mechanical actuators thereof), contact switches (e.g., integrated as an add-on to a flight-deck systems, coupled to effectors and/or mechanical actuators thereof), remote sensors (e.g., remote validation interface sensors, ground station sensors such as time-of-flight sensors monitoring the aircraft, etc.), audio sensors (e.g., pilot Push To Talk [PTT], ATC radio, pilot headset, engine noise acoustic sensors, etc.), motion sensors, inertial sensors, force sensors, strain gages, and/or any other suitable sensors or pilot data sources. Auxiliary data is preferably time-correlated (e.g., stored as a timeseries), but can alternatively be ordered, sequential, batched, and/or otherwise suitably stored. Auxiliary data can be collected: continuously, discretely, periodically, aperiodically, in response to an event trigger or a verification trigger (i.e., for each iteration of S300), a time threshold, a determination of an event advisory; and/or with any other suitable timing/frequency.

In variants, the HMI can include an ancillary screen (e.g., portable touchscreen device, portable device, etc.) and/or other portable device which can display information (e.g., instructions, commands, verification requests/prompts, etc.) to the pilot and/or receive pilot inputs as a part of the HMI. For example, the HMI can include an ancillary screen, which is separate from a built-in MFD (e.g., separately certified as a portable device, flight aid; etc.), which can provide additional sensory inputs and/or serve to display (visual) feedback.

In variants, auxiliary data can be considered separate, redundant, independent, and/or orthogonal to aircraft state sensing and/or aircraft control feedback sensing. Additionally or alternatively, auxiliary data may be correlated with or dependent on aircraft state data, For example, auxiliary data may generally capture the same or substantially similar sensory modalities/information available to a pilot or co-pilot performing a cross-check on an aircraft configuration change. For instance, in order to verify various configuration changes, a pilot (and/or auxiliary data) may visually monitor: effectors state (e.g., flaps, landing gear, etc.; observing them with in a mirror), switch states on the flight deck, flight deck indicators, and/or otherwise visually monitor/verify the aircraft configuration.

As an example, inputs for checklist verification in S300 can include: CV monitoring of indicators (e.g., gauges, switches, levers, lights, buttons, etc.), RDC data from the aircraft, and pilot inputs (e.g., verbal and/or via an MFD).

However, the auxiliary data and the set of inputs can include any other suitable data generated with any suitable set of data sources.

Using the set of inputs, the verification parameters can be determined by evaluating the aircraft configuration with a set of checks. The set of checks are preferably predetermined for each (deterministic) aircraft configuration (i.e., a predetermined checklist procedure; stored in a checklist library, etc.), but can additionally or alternatively be dynamically determined (e.g., dynamic range based on aircraft state or context, such as modifying a check range based on the flight envelope and/or ambient environmental conditions, etc.), and/or otherwise implemented. In variants, checks can be deterministically evaluated (e.g., using a lookup table, deterministic function, etc.) to yield a set of verification parameters. Additionally or alternatively, verification checks be used to evaluate discretionary configurations, where verification results may be deterministic (e.g., based on a deterministic comparison with a discretionary parameters or ranges of discretionary effector positions), non-deterministic (e.g., based on a dynamic comparison for the current aircraft state/context), and/or include a discretionary verification parameter/score (e.g., scoring how 'reasonable' state parameters may be for a current aircraft context). Individual checks of the set can include deterministic comparisons (e.g., deterministically evaluating whether a parameter value or state matches a static value/state), dynamic comparisons (e.g., comparing a parameter value to a dynamically computed discretionary range, based on the aircraft state, based on ambient conditions, etc.), probabilistic checks (e.g., verifying that a classification probability exceeds a predetermined threshold), heuristic checks, decision-tree checks, and/or any other suitable set of evaluations/comparisons.

Figure 3:
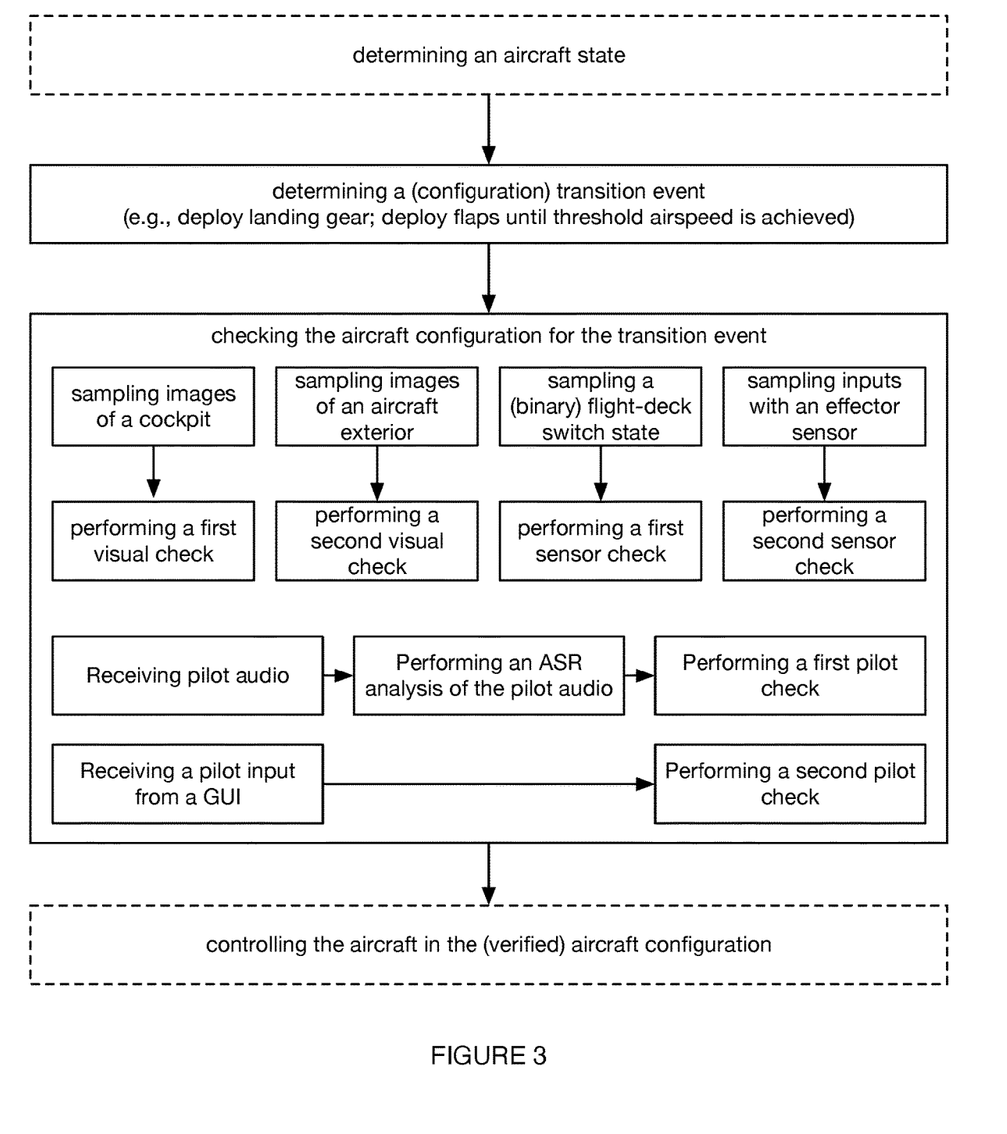
FIG. 3 is a flowchart diagram of a variant of the method.

In a first example (e.g., an example is shown in FIG. 3), a belief state may specify that the landing gear is deployed in a current aircraft configuration. The set of inputs of S300 can include: images of the cockpit, images of an aircraft exterior, a binary switch state of a landing gear switch on the flight deck, actuation state feedback from a landing gear actuator sensor. The set of checks can include binary checks that the actuation state feedback and the binary switch state match a predetermined state (e.g., associated with the deployed configuration, such as specified by the pilot). Additionally, with CV-analyses, the images of the cockpit and aircraft exterior can be used to classify the position of the landing gear switch, landing gear indicators on the flight deck, and/or effector arrangement relative to the aircraft, which can be used to perform further (visual) checks.

Figure 4:
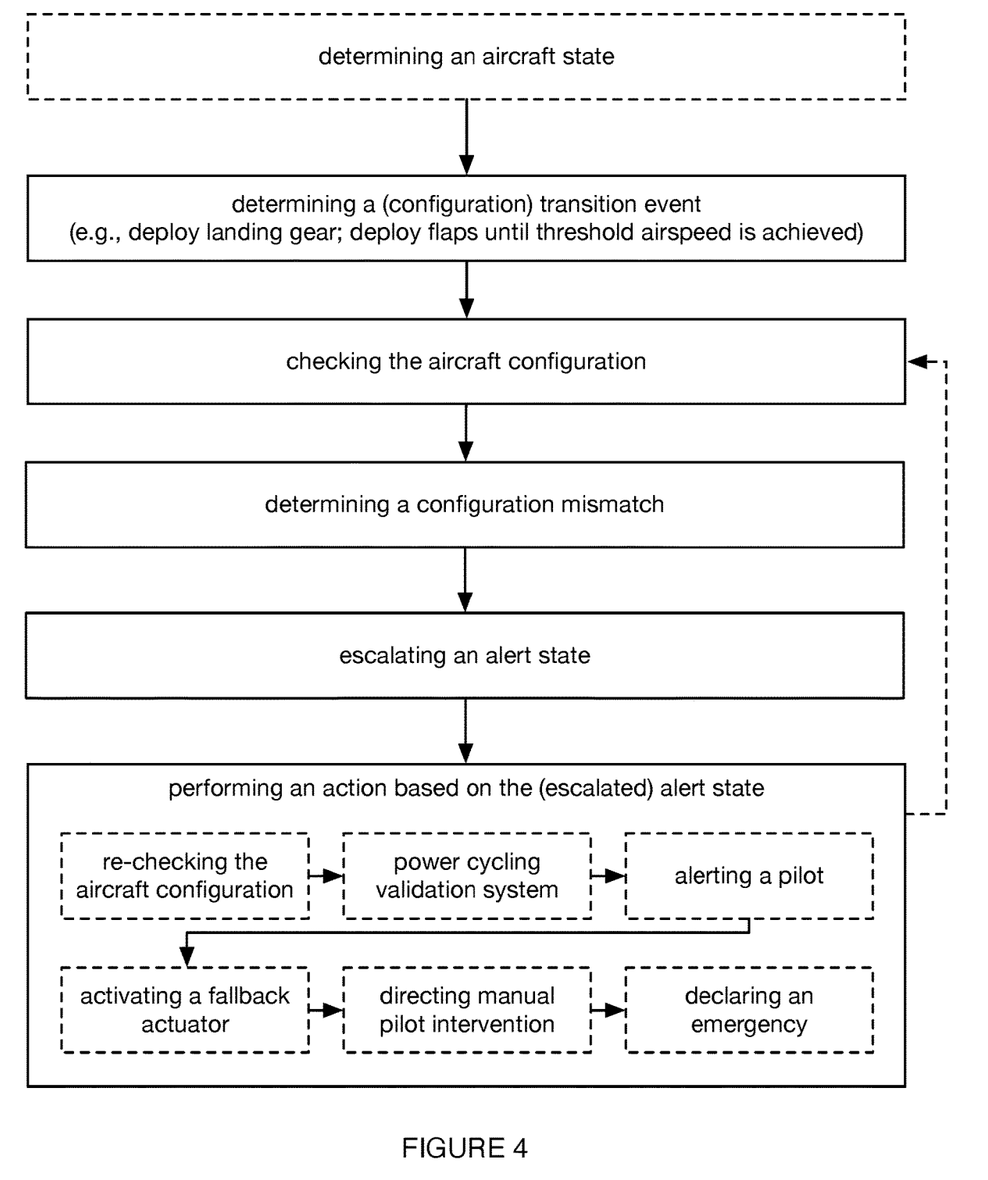
FIG. 4 is a flowchart diagram of a variant of the method.
Figure 5:
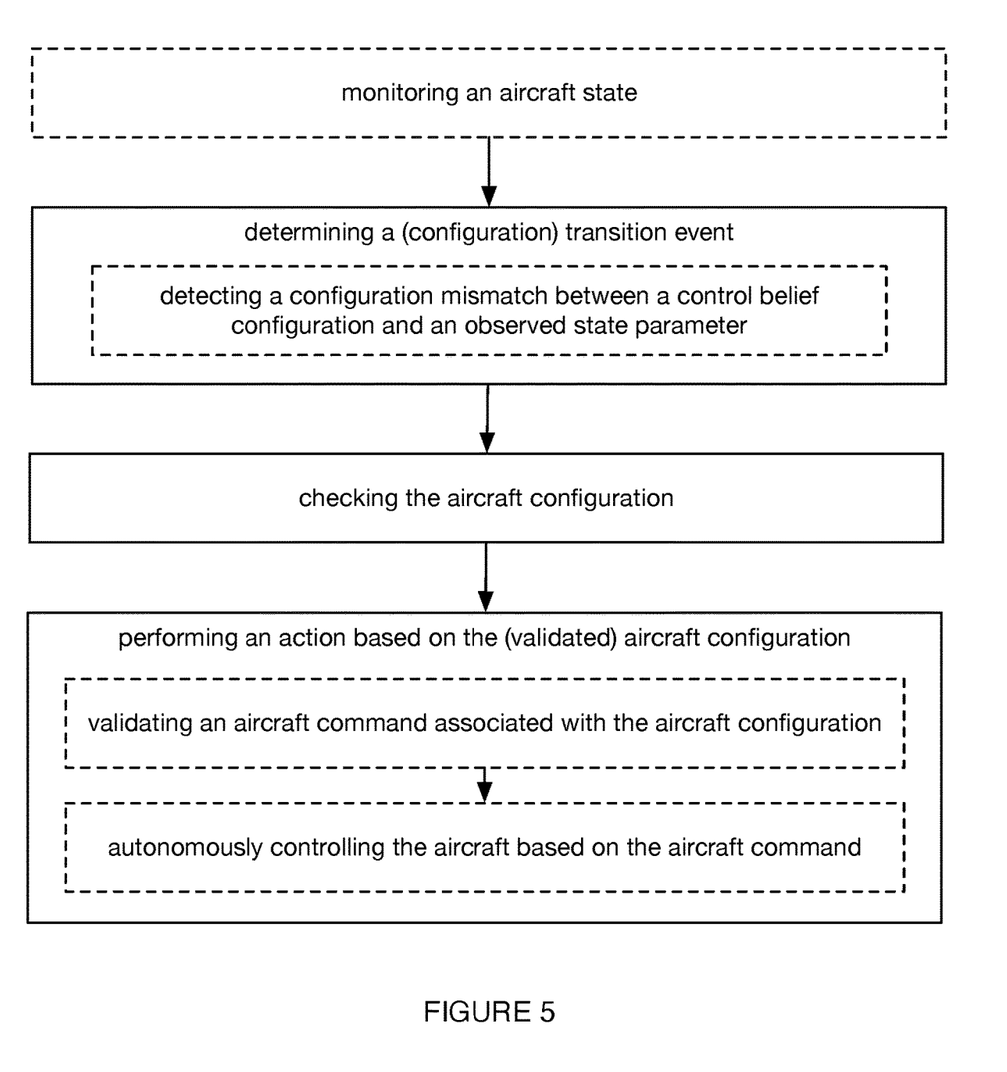
FIG. 5 is a flowchart diagram of a variant of the method.
Figure 6:
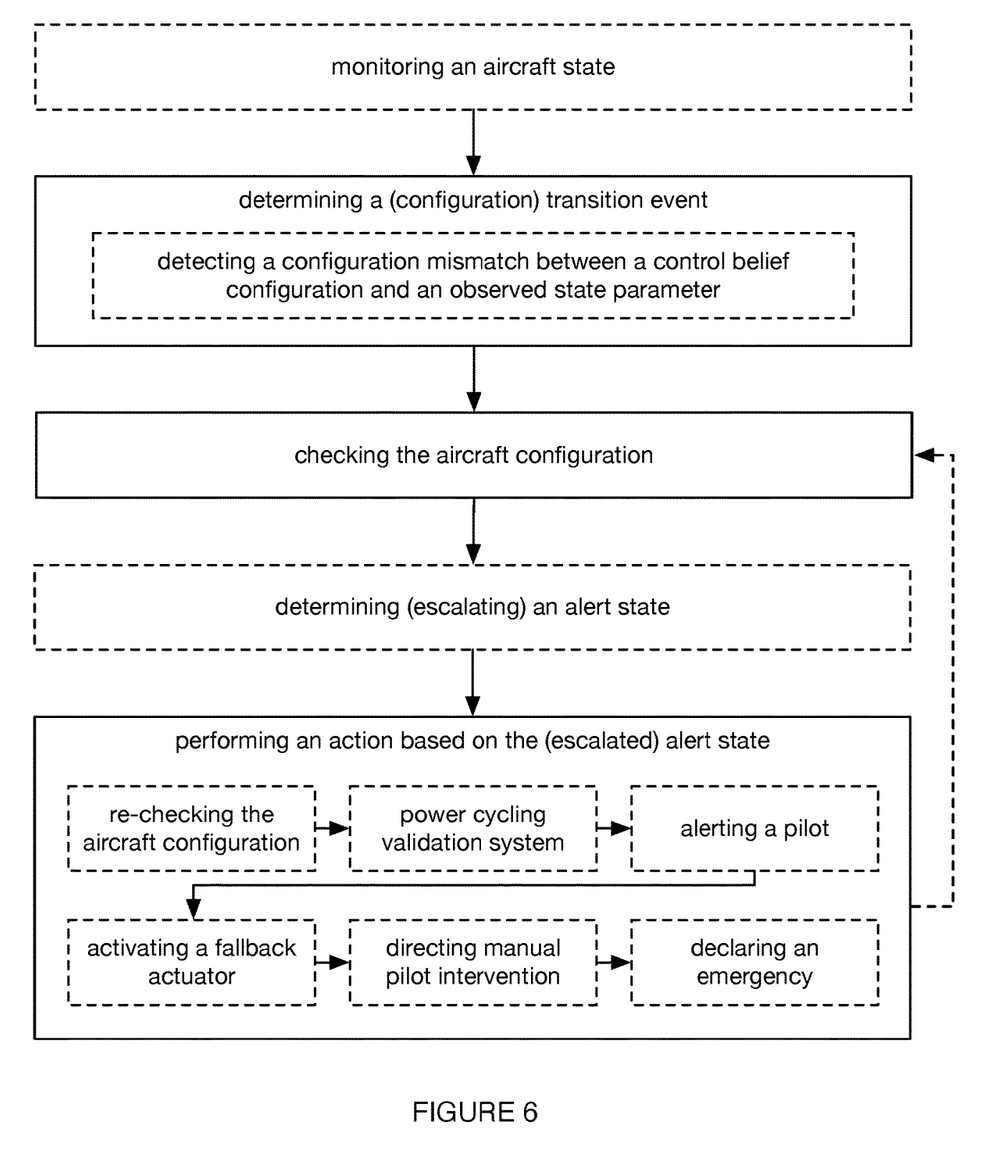
FIG. 6 is a flowchart diagram of a variant of the method.

In cases where the belief state is verified by the set of checks and/or where the set of verification parameters confirm the belief state (and/or an aircraft configuration transition), the verification parameter(s) can be provided as an output of S300 (e.g., an example is shown in FIG. 3, a second example is shown in FIG. 5) to facilitate aircraft control via S500. Alternatively, in cases where the aircraft configuration cannot be verified (e.g., an example is shown in FIG. 4, a second example is shown in FIG. 6) and the result corresponds to a configuration mismatch, S300 can may facilitate execution of a predefined, deterministic sequence of escalations/actions based on an alert state (e.g., in conjunction with S500). For example, an escalation checklist or state machine for a sequence of escalating actions based on the alert state (and optionally the aircraft configuration) can be predetermined (e.g., stored in a local aircraft memory prior to takeoff).

Figure 7:
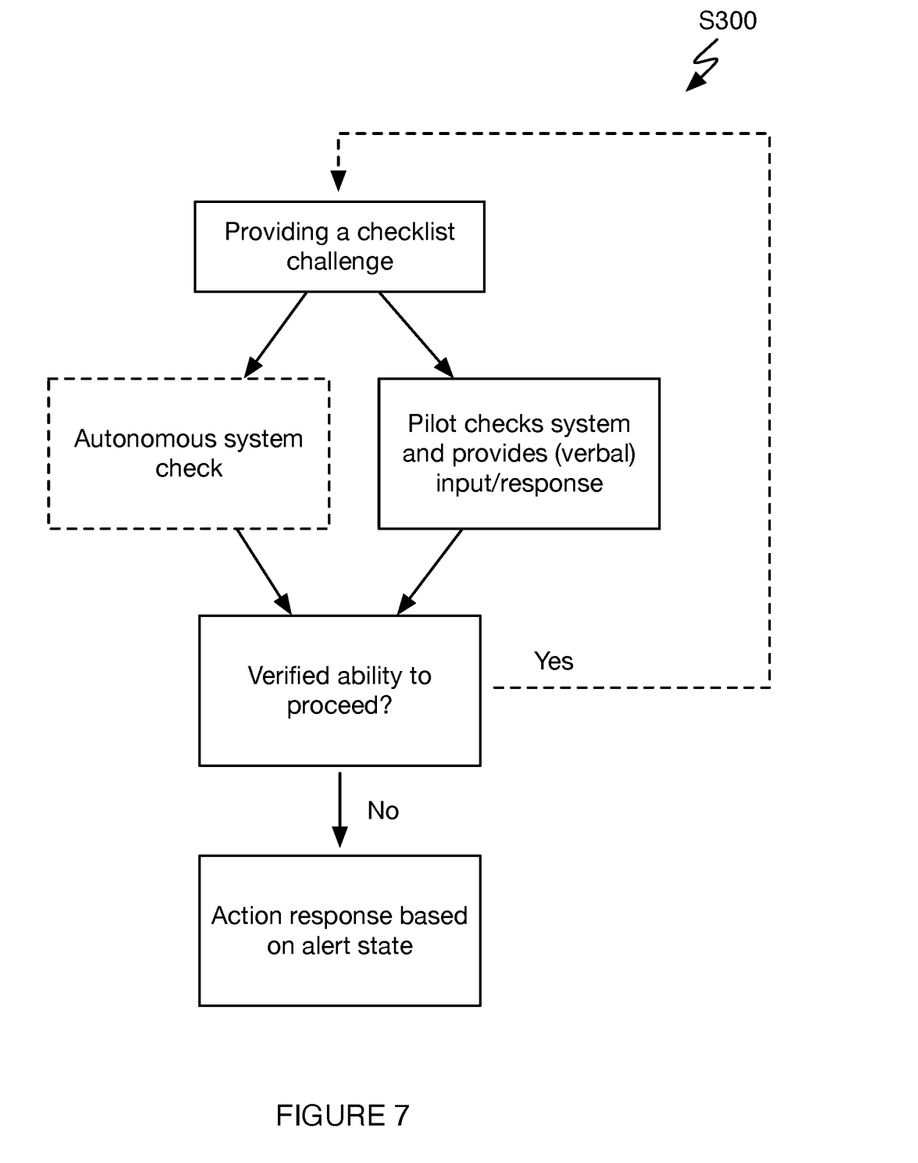
FIG. 7 is a flowchart diagram for a variant of the method illustrating process flow for checklist automation.

The belief state can be determined by prompting (a.k.a., challenging) the pilot response (e.g., an example is shown in FIG. 7), can be determined automatically (e.g., based on the transition event), and/or can be otherwise determined. For example, the pilot can be prompted with a checklist challenge via the HMI and/or an audio prompt. Prompts can be provided via synthetically voiced audio (e.g., text to speech; prerecorded audio; etc.), a display, and/or can be otherwise prompted. The prompt preferably includes a system component and/or task for the pilot to perform (e.g., "parking brake"). In response, the pilot preferably provides an input belief state (and/or pilot specified configuration) associated with the prompt and corresponding aircraft component to facilitate verification.

Figure 8:
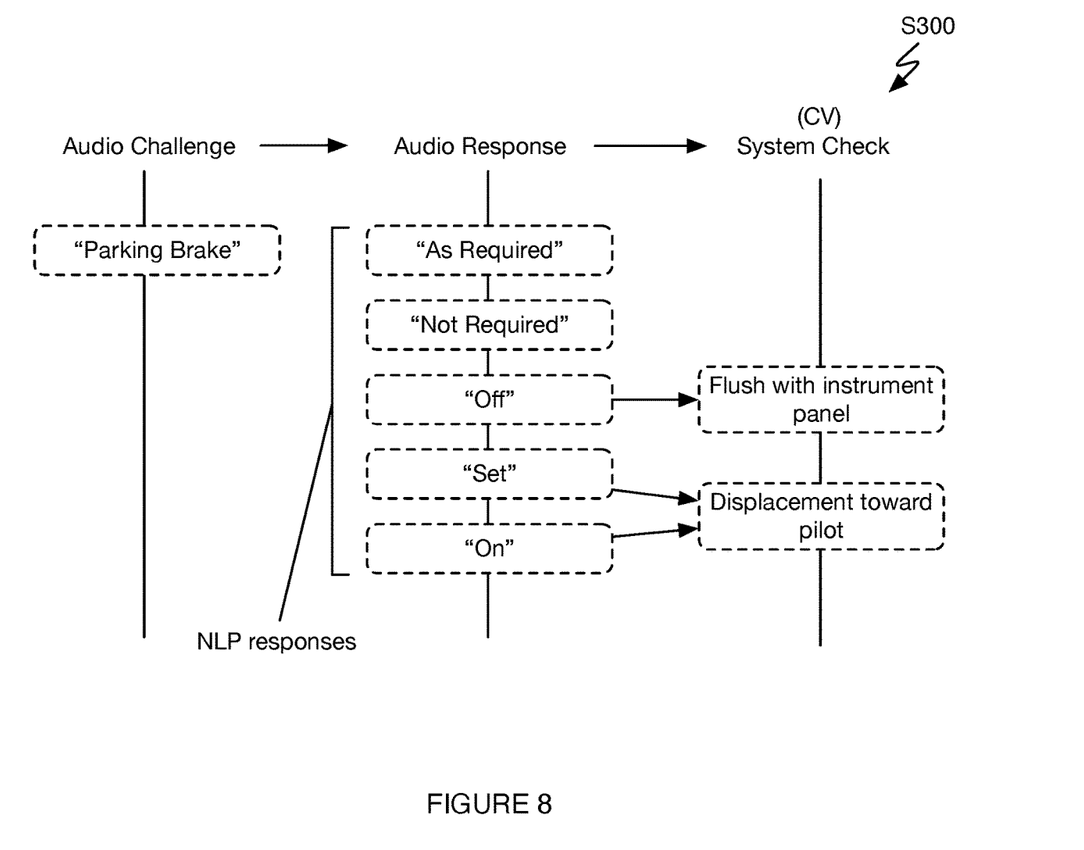
FIG. 8 is a process flow example of a system check for a parking brake in one or more variants of the method.

More preferably, the pilot may respond with one of a predefined set of responses (and/or in a predefined response format), which may provide inputs for automated/autonomous verification. Pilot responses can be mapped to a predefined system check for automated verification (e.g., an example is shown in FIG. 8). Additionally or alternatively, a subset of pilot responses may be accepted and/or determined to intrinsically verify the check (e.g., without further verification), such as based on predetermined rules/heuristics (e.g., a pilot response of "Not Required" may not require further checks).

In variants, S400 can optionally include determining an aircraft alert state, which functions to initiate a sequence of (escalating) actions if the aircraft configuration cannot be verified (e.g., re-checking the aircraft configuration between each escalating action/intervention). S400 preferably determines the aircraft alert state with a predetermined, deterministic state machine (e.g., based on the current alert state; which may be substantially similar for some aircraft configurations and/or dependent on the aircraft configuration/state), however the alert state can additionally or alternatively be determined with a decision tree, lookup table, a set of heuristic decisions, and/or can be otherwise suitably determined.

However, the aircraft configuration can be otherwise suitably verified or checked.

However, the aircraft alert state can be otherwise suitably determined and/or may be excluded entirely (e.g., where actions may be deterministic for a particular aircraft state; where the alert state can be a parameter of the aircraft state or inferred based on the aircraft state).

Optionally performing an action S500 functions to facilitate aircraft control based on the aircraft configuration and/or verified (successful) configuration transition. Additionally or alternatively, S500 can function to respond based on the aircraft alert state. Actions can include: autonomously providing a confirmation of a verified configuration transition to an onboard pilot (e.g., a human pilot; an autonomous agent performing a pilot role); initiating an automated ATC communication (e.g., declaring an aircraft emergency; requesting a flight advisory based on the aircraft state and/or configuration transition; providing a status update based on a verified configuration transition; etc.), communicating with a ground infrastructure, communicating the verified aircraft configuration to an aircraft computing system (e.g., FMS/FCS, etc.; updating an aircraft configuration at an aircraft computing system, which may be used to control the aircraft based on the updated aircraft configuration), autonomously controlling the aircraft (e.g., such as with an autonomous computing system, based on the updated aircraft configuration) and/or any other suitable actions. In cases where the aircraft configuration cannot be verified (and/or where the alert state may be escalated), actions can include: re-checking the aircraft configuration (e.g., by a subsequent method iteration and/or subsequent data), power cycling elements of the system (e.g., validation system/processors; sensing systems; etc.), alerting a pilot (e.g., remote pilot; onboard pilot; via a portable device and/or ancillary screen thereof, etc.), activating a fallback actuator (e.g., a secondary/redundant actuator, etc.), directing manual pilot intervention (e.g., manual control of a hydraulic actuator; manual pilot actuation input; manual actuation; via a portable device arranged on-board the aircraft; etc.), declaring an emergency, and/or any other suitable actions.

In variants, actions and/or responses can be based on the alert state, which may facilitate appropriate escalation of responses (e.g., based on criticality, data volume, failure probabilities, etc.). For example, actions can occur according to a predetermined/deterministic sequence (e.g., deterministic for the type of aircraft) or checklist. In variants, aircraft configurations may include some discretionary/non-deterministic decisions, however the alert state escalations and/or resulting aircraft/pilot actions may be deterministic (e.g., predetermined, specified in a flight manual, etc.).

However, any other suitable actions can be performed/implemented and configuration checks and/or aircraft alert state can be otherwise implemented or integrated into aircraft operations.

5. Communication Validation

Figure 10:
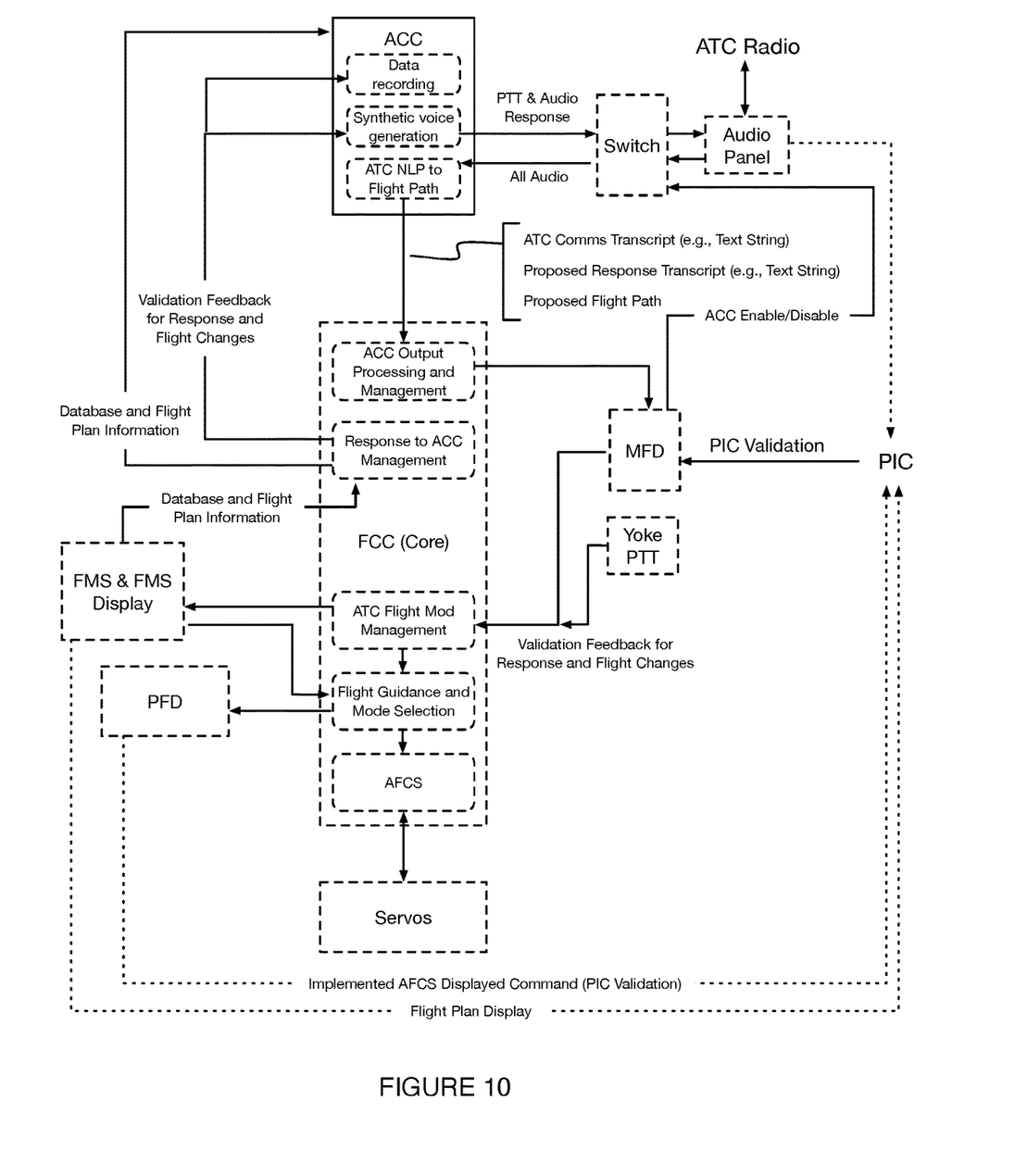
FIG. 10 is a schematic diagram of a variant of the system.

In one set of variants, the system and/or method can optionally include and/or can be utilized with a Multi-Function Display (MFD) which functions to display messages to the pilot (e.g., with a speech to text functionality and/or semantic parsing of key parameters/information; ATC messages; checklist challenges; etc.), provide the system inputs response and action validation, and/or provide pilot inputs (e.g., a variant of the system integrating a MFD is illustrated in FIG. 10). The system can display information to the pilot (e.g., advisory messages, checklist tasks, etc.), which can include: the original advisory/message, the proposed response (e.g., when applicable; in a dedicated or persistently allocated space/region of the display; as a pop-up menu or notification; etc.), the proposed action to take (e.g., when applicable; in a dedicated or persistently allocated space/region of the display; as a pop-up menu or notification; etc.), and/or any other suitable information.

The screen can also display options for rejecting and accepting the proposed response and/or command. The options can be activated by soft buttons, a touch screen located on the MFD (e.g., via a touch screen input such as a touch, press-and-hold, swipe, etc.), and/or via any other input components. In variants, options can additionally be confirmed/validated by a secondary input (e.g., soft button confirmation) after a selected action and/or buttons may be physically distanced/separated (e.g., which may reduce/avoid pilot errors or inadvertent actions). In variants, reading in Push-To-Talk [PTT] audio, such as by Automatic Speech Recognition (ASR), can be used to confirm, cancel, and/or facilitate any other suitable set of pilot inputs (e.g., from a set of predefined checklist responses, etc.).

In variants, in addition to the accept/reject options on the MFD, the Pilot can have an additional method to provide binary responses via a two position switch located on the yoke. The first position can confirm or accept a proposed response. The second position can both reject a proposed response (when available) and provide/activate the Pilot's PTT function. As an example, the two-position switch can replace an existing single position PTT switch (e.g., which may be natively integrated on a certified aircraft). Due to the frequency of ATC messages and/or checklist responses, the yoke switch may provide a more ergonomic option compared to the MFD buttons. This option can also reduce changes to the procedure for responding to ATC and/or checklist procedures.

In variants, the Automated communication functions can be enabled by a switch activated through the MFD. The Automated Communication Computer (ACC) can host natural language processing (NLP) and synthetic voice generation functions and can be connected to the audio panel through an enable switch. As an example, the switch can send a discrete signal to/via the FCC so the FCC receives the ACC state (e.g., and then the FCC can send a discrete signal to the switch). If the system malfunctions, the PIC may have the option to disconnect the ACC from the radios and/or checklist engine. Accordingly, any system failures can be localized and/or may not interfere with the pilot's communication.

Upon powerup, the ACC can receive the aircraft tail number (and/or additional aircraft identification parameter [s]) from the FCC.

The automated communication function may utilize flight plan information to assist interpretation of messages such as determining nearby waypoints. At the start of a flight, the FMS can send the flight plan and surrounding (and/or regional) navigational database information to the ACC. This information can include one or more of: flight plan, surrounding waypoints along the route, arrival and departure airports, SIDS, STARS, runways, and/or any other suitable information. If there is a change to the flight plan during the flight, the updated information can be sent to the ACC.

Synthetic voice generation, NLP of pilot audio (PTT), and/or flight advisory actions/resolutions may likewise be utilized in conjunction with checklist automation procedures and/or configuration checking, and/or can be otherwise suitably implemented.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for an aircraft, comprising:
   at a first computing system, determining an aircraft transition event;
   in response to the aircraft transition event, automatically initializing a checklist procedure to verify an aircraft configuration with the first computing system, the checklist procedure comprising a plurality of checks,
      for a first subset of the plurality of checks: prompting a pilot to verify a respective state parameter of the aircraft configuration and confirming the respective state parameter based on a pilot input, and
      for a remainder of the plurality of checks: autonomously verifying a respective state parameter of an aircraft configuration based on a set of onboard sensors and notifying the pilot of the verification; and
   automatically performing an action, with the first computing system, based on the checklist procedure.

2. The method of claim 1, wherein the checklist procedure is executed at an autonomous computing system onboard the aircraft, the autonomous computing system communicatively coupled to an aircraft computing system which comprises a flight management system (FMS), wherein performing the action comprises controlling the aircraft according to a flight command at an aircraft computing system.

3. The method of claim 2, wherein the autonomous computing system comprises a portable device.

4. The method of claim 2, wherein the autonomous computing system performs a set of co-pilot operations for the checklist procedure.

5. The method of claim 2, wherein each check of the checklist procedure is completed sequentially and with inputs from both the pilot and the autonomous computing system.

6. The method of claim 1, wherein the checklist procedure is manually initialized via voice input.

7. The method of claim 1, wherein the checklist procedure is automatically triggered based on the aircraft state.

8. The method of claim 1, wherein prompting the pilot comprises an auditory checklist challenge, wherein the pilot input comprises an audio input from an onboard audio sensor, wherein confirming the respective system state based on a pilot input comprises a Natural Language Processing (NLP) evaluation of the audio input.

9. The method of claim 8, wherein, for a first subset of checks, the respective system state is further confirmed based on integrated onboard sensing.

10. The method of claim 1, wherein the set of onboard sensors comprises a camera, wherein, for the remainder of checks, autonomously verifying the respective state parameter comprises: estimating an instrument state by computer vision (CV) analysis of an image from the camera.

11. The method of claim 10, wherein the instrument state comprises a gauge value.

12. The method of claim 11, further comprising: receiving instrument state data from a Remote Data Concentrator (RDC) of the aircraft.

13. The method of claim 1, wherein, for the remainder of checks, autonomously verifying the respective state parameter comprises measuring the instrument state with a set of portable sensors.

14. The method of claim 1, wherein the action comprises: triggering a secondary checklist procedure based on the first checklist procedure.

15. The method of claim 1, further comprising: triggering a request for pilot intervention based on at least one of the plurality of checks.

16. The method of claim 1, further comprising: escalating an alert state based on a failure to complete a check of the checklist, wherein the action is based on the alert state.

17. The method of claim 1, wherein the plurality of checks comprises a first check, a second check, and a third check, the checklist procedure comprising:
   automatically prompting a pilot to verify a first state parameter associated with the first check;
   determining a first pilot input and, based on the first pilot input, confirming the first state parameter;

in response to confirmation of the first state parameter, automatically determining a second set of sensor data associated with a second check; and verifying a second state parameter of the aircraft state based on a set of onboard sensors and notifying the pilot of the verification of the second state parameter.

18. A method for an aircraft, comprising:

in response to an aircraft transition event, retrieving a checklist associated with the aircraft transition event, the checklist comprising a sequence of checks, each check associated with a respective aircraft component and comprising challenge text and a predefined set of respective responses;

for a first check of the sequence, providing a first synthetic utterance of the challenge text using text-to-speech transformation, receiving audio data and instrument state data;

determining a pilot response to the first synthetic utterance, within the predefined set of respective responses for the first check, by Natural Language Processing (NLP) of the audio data;

based on the pilot response and the instrument state data, autonomously verifying the first check of the sequence using the instrument state data;

based on the autonomous verification of the first check, updating an aircraft configuration at an aircraft computing system; and controlling the aircraft based on the updated aircraft configuration.

19. The method of claim 18, wherein instrument state data comprises estimated instrument states determined by computer vision (CV) analysis of a set of indicators.

20. The method of claim 19, wherein the CV analysis, the NLP, and the text-to-speech transformation are executed at a portable device which is communicatively coupled to the aircraft computing system.

21. The method of claim 18, further comprising: receiving a second set of instrument state data after the first check; and based on the second set of instrument state data, automatically requesting pilot intervention based on a second check of the sequence.

* * * * *